(12) United States Patent
Bayat

(10) Patent No.: US 12,182,533 B2
(45) Date of Patent: Dec. 31, 2024

(54) DATA PROCESSING SYSTEM CONFIGURED FOR SEPARATED COMPUTATIONS FOR POSITIVE AND NEGATIVE DATA

(71) Applicant: MENTIUM TECHNOLOGIES INC., Santa Barbara, CA (US)

(72) Inventor: Farnood Merrikh Bayat, Goleta, CA (US)

(73) Assignee: MENTIUM TECHNOLOGIES INC., Santa Barbara, CA (US)

( * ) Notice: Subject to any disclaimer, the term of this patent is extended or adjusted under 35 U.S.C. 154(b) by 981 days.

(21) Appl. No.: 17/100,748

(22) Filed: Nov. 20, 2020

(65) Prior Publication Data

US 2021/0150413 A1 May 20, 2021

Related U.S. Application Data

(60) Provisional application No. 62/938,211, filed on Nov. 20, 2019, provisional application No. 62/938,207, (Continued)

(51) Int. Cl.
*G06F 7/544* (2006.01)
*G06F 1/3234* (2019.01)
(Continued)

(52) U.S. Cl.
CPC .......... *G06F 7/5443* (2013.01); *G06F 1/3243* (2013.01); *G06F 1/329* (2013.01);
(Continued)

(58) Field of Classification Search
CPC ........ G06F 7/4824; G06F 7/5443; G06F 7/52; G06F 7/74; G06F 7/4991; G06F 7/38;
(Continued)

(56) References Cited

U.S. PATENT DOCUMENTS 3,079,081 A * 2/1963 Coste .................... G06F 7/5332
341/94
5,691,931 A * 11/1997 Nitta ....................... G06F 7/509
708/670

(Continued)

OTHER PUBLICATIONS

Zhang, J.J., & Garg, S. (2018). FATE: Fast and Accurate Timing Error Prediction Framework for Low Power DNN Accelerator Design. 2018 IEEE/ACM International Conference on Computer-Aided Design (ICCAD), 1-8. (Year: 2018).*

(Continued)

*Primary Examiner* — Andrew Caldwell
*Assistant Examiner* — Carlo Waje
(74) *Attorney, Agent, or Firm* — Maschoff Brennan

(57) ABSTRACT

A method includes obtaining input data and separating the input data into a first subset of input data and a second subset of input data, the first subset of input data including positive input data and the second subset of input data including negative input data. The method includes performing positive computations on the first subset of input data to determine one or more first results and performing negative computations on the second subset of input data to determine one or more second results. The method includes aggregating the one or more first results and the one or more second results to determine a solution based on the aggregating. The method includes executing an application using a machine learning model or a deep neural network based on the determined solution.

18 Claims, 9 Drawing Sheets

Related U.S. Application Data filed on Nov. 20, 2019, provisional application No. 62/938,214, filed on Nov. 20, 2019, provisional application No. 62/938,217, filed on Nov. 20, 2019.

(51) Int. Cl.
| | |
|---|---|
| *G06F 1/329* | (2019.01) |
| *G06F 5/01* | (2006.01) |
| *G06F 7/499* | (2006.01) |
| *G06F 7/50* | (2006.01) |
| *G06F 7/523* | (2006.01) |
| *G06F 7/74* | (2006.01) |
| *G06F 9/50* | (2006.01) |

(52) U.S. Cl.
CPC .............. *G06F 5/01* (2013.01); *G06F 7/4991* (2013.01); *G06F 7/50* (2013.01); *G06F 7/523* (2013.01); *G06F 7/74* (2013.01); *G06F 9/5027* (2013.01)

(58) Field of Classification Search
CPC . G06F 7/57; G06F 7/575; G06F 17/10; G06F 17/15; G06F 17/16; G06F 1/329; G06F 2207/3808; G06F 2207/3832; G06F 2207/3836; G06N 3/08; G06N 20/00
See application file for complete search history.

(56) References Cited

U.S. PATENT DOCUMENTS

| | | | |
|---|---|---|---|
| 9,606,608 B1* | 3/2017 | Langhammer | G06F 7/4876 |
| 2004/0148321 A1 | 7/2004 | Guevorkian et al. | |
| 2013/0246491 A1* | 9/2013 | Panda | G06F 7/509 |
| | | | 708/518 |
| 2018/0004708 A1* | 1/2018 | Muralimanohar | G06F 17/16 |
| 2018/0173497 A1* | 6/2018 | Stewart | G06F 7/4991 |
| 2018/0225116 A1 | 8/2018 | Henry et al. | |
| 2019/0042252 A1* | 2/2019 | Kaul | G06F 9/30036 |
| 2020/0364287 A1* | 11/2020 | Bekooij | G06F 17/142 |
| 2020/0372097 A1* | 11/2020 | Mattina | G06F 17/16 |
| 2020/0401376 A1* | 12/2020 | Najafi | G06F 7/70 |
| 2021/0150306 A1* | 5/2021 | Lin | G06N 3/045 |

OTHER PUBLICATIONS

International Search Report and Written Opinion issued in corresponding application No. PCT/US2020/061685, dated Feb. 25, 2021.

* cited by examiner

DATA PROCESSING SYSTEM CONFIGURED FOR SEPARATED COMPUTATIONS FOR POSITIVE AND NEGATIVE DATA

CROSS-REFERENCE TO A RELATED APPLICATION

This patent application claims the benefit of and priority to U.S. Provisional Application Nos. 62/938,211, 62/938,207, 62/938,214, and 62/938,217, each filed Nov. 20, 2019 and incorporated herein by reference in their entireties.

BACKGROUND

A computer may perform computations relating to quantitative data. The computer may consume electrical power to perform said computations.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include obtaining input data and separating the input data into a first subset of input data and a second subset of input data, the first subset of input data including positive input data and the second subset of input data including negative input data. The operations may include performing positive computations on the first subset of input data to determine one or more first results and performing negative computations on the second subset of input data to determine one or more second results. The operations may include aggregating the one or more first results and the one or more second results to determine a solution based on the aggregating. The operations may include executing an application using a machine learning model or a deep neural network based on the determined solution.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Figure 1:
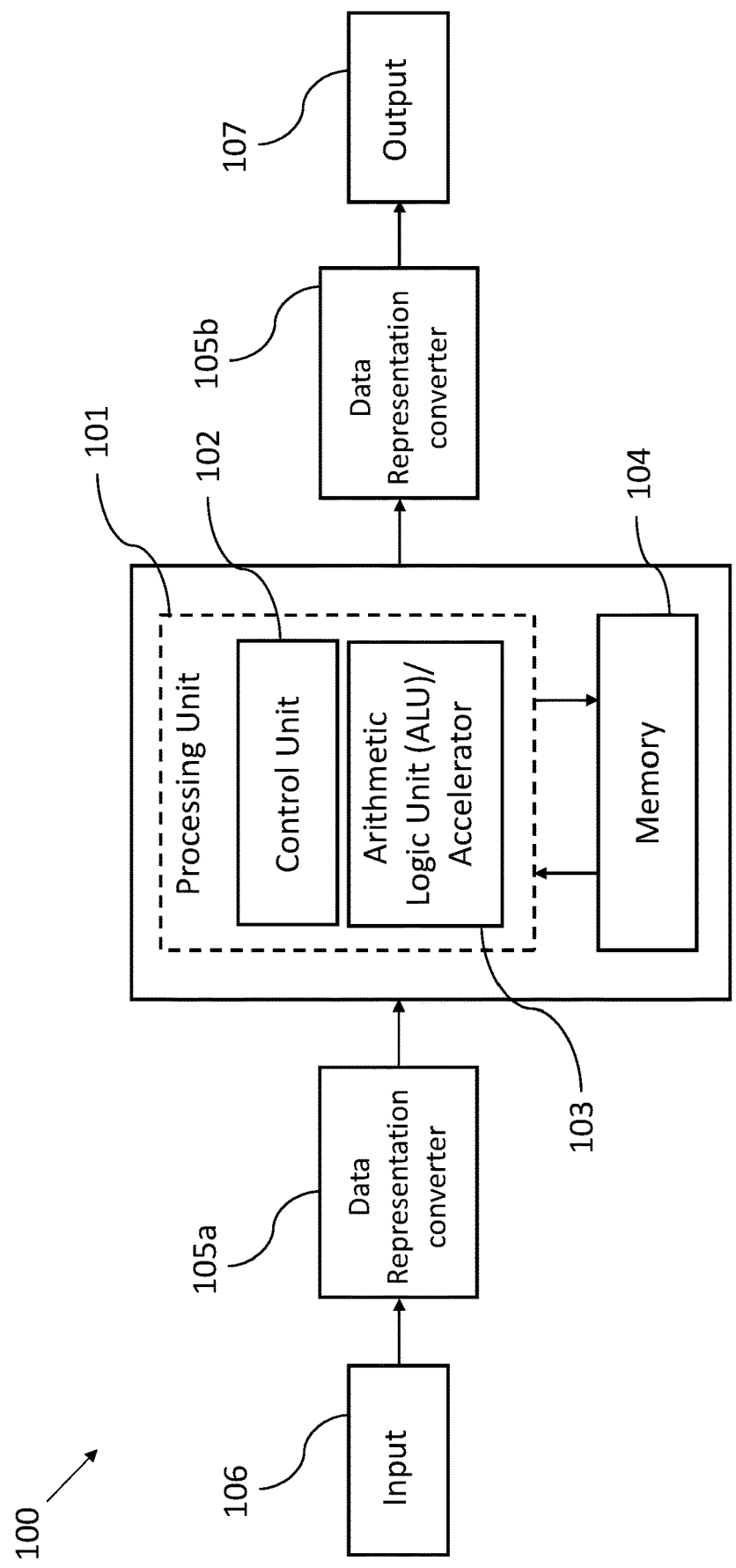
FIG. 1 illustrates a digital computing system processing data with different representation than the one used outside of the system.

Implementation of computationally expensive applications like deep neural networks or machine learning algorithms in real time may not be possible without the use of dedicated hardware or accelerators. These accelerators can expedite the execution of these algorithms by running computations in parallel and at higher speeds and throughputs. However, this computation acceleration comes with the cost of having higher power consumption which may prevent the system from being used in environments with limited energy resources like at the edge.

The accelerators may consume most of their dynamic power in 4 main sections: (i) memories, (ii) communication between blocks, (iii) clock-tree, and (iv) the accelerator itself. The power consumed in each of these sections may be reduced for example by lowering the operating voltages, decreasing the clock-frequency, performing computations at lower precision, or by going to more advanced technology nodes. Among these options, lowering the operating voltage or clock-frequency may not be very appealing since they may also lower the speed and throughput of the whole system. Moving to a more advanced technology node is the simplest solution but it may increase the cost of fabrication substantially.

Power consumed in accelerators may be reduced significantly by performing computations at lower precisions such as at 8 bits, 4 bits, or even 1 bit. Lowering the precision at which data is represented may reduce the accuracy of computation and/or degrade the performance of the system. However, the reduced accuracy of computation and/or the degraded performance of the system may be acceptable in applications such as deep neural networks and machine learning algorithms, which can tolerate imprecise computations. The possibility of performing computations at lower precision may reduce the needed resources and circuits on the chip and may consequently lower the power consumed due to the reduction in switching activities of internal nodes. However, it should be noted that although data may be represented with lower precision, internal computations may still be performed at higher precisions.

Unlike the power consumed in clock-tree and most memories, the power consumed inside the accelerator itself and to transfer the data around the chip may depend on the statistics of the data, the amount of correlations between subsequent data, how the data is represented or encoded, etc. because these factors may directly affect at what frequency the internal nodes or digital gates may switch. While some data representations like 2's complement may have higher power consumption when data have non-uniform distribution, others may result in less power consumption for similar data distributions.

Certain embodiments of the present disclosure may provide improvements over previous iterations of computing systems, such as digital accelerators. For example, the efficiency of computations performed by a computing system may be increased, and/or the power consumption of the computing system may be decreased by configuring the computing system in a manner in which the computing system is able to perform computations on positive input data and on negative input data in parallel. As another example, machine learning models and/or deep neural networks may be improved by configuring the computing system in a manner in which the power consumption of the computing system may be decreased as described in the present disclosure. As another example, computing and network resources may be preserved as computations including positive input data and negative input data may be simplified and performed more efficiently or approximately.

One or more embodiments of the present disclosure may include a data processing system (e.g., a digital accelerator). The data processing system may execute a set of operations on the received data to deliver the output. Data entering the data processing system may be obtained from outside of the chip or from the memory inside the chip. The result produced by the data processing system may be sent to the outside of the chip or may be stored inside the internal memory. The data processing system may also include a control unit managing the data flow and controlling the computations performed in the system. The data processing system may also include one or more other blocks that may be used for the proper functionality of the data processing system at any given application.

The data processing system may include optional data representation conversion module(s) to change the way data is represented responsive to the data entering the system or changing the way the data is represented to its original format responsive to the data exiting the system. This may allow the data processing system to be designed and work on different data representations than those used outside of the system. Different data representations may be used in this configuration like but not limiting to 1's complement, 2's complement, sign-magnitude, etc. A particular data representation may be selected based on the statistics and distributions of the data being processed, the correlation between subsequent data, resolution of each data sample, etc. For example, 2's complement may be used to represent data having a random distribution, and sign-magnitude data representation may be used to represent data having a Gaussian-like distribution centered around zero. The selected data representation may directly impact the power consumed in the data processing system (e.g., an Arithmetic Logic Unit (ALU) configured to operate as an accelerator) since they may result in different switching frequencies of internal nodes and logic gates within the system.

For applications like deep neural networks or machine learning algorithms where both network parameters and feature maps have Gaussian-like distribution centered around zero and feature map data are highly correlated, sign-magnitude data representation may be used to lower the power consumption compared to other data representing algorithms like 2's complement.

In some embodiments, changing the data representation may be used to reduce the power consumed for communications to transfer the data between different modules of the data processing system (e.g., like the ALU and the memories). Similar to as described above, a choice of data representation may depend on the statistics and distributions of the data being processed, the correlation between subsequent data, resolution of each data sample, etc. Transferring data represented as sign-magnitude may consume less power than other data representations for correlated data having small amplitudes (such as in deep neural networks and machine learning algorithms).

The data processing system may further reduce the power consumed when processing a sequence of data by separately performing computations on positive and negative numbers or using two independent modules (e.g., two independent accelerators such as two separate ALUs) to separately process positive and negative numbers in parallel. An aggregating module in the data processing system may be responsible for aggregating the results generated by the positive and negative modules to produce the final results. Using separated modules may reduce the power consumed by the data processing system if a large number of bits is switched when switching between positive and negative numbers. For example, a first particular system using 2's complement data representation may switch all N bits representing the data switching between +1 and −1. On the other hand, a second particular system using sign-magnitude data representation may switch 2 bits to represent the data switching between +1 and −1. Using separate modules representing the data as 2's complements for processing positive and negative numbers may reduce the switching activities of internal circuits by preventing the back and forth switching of bits when going from a positive number to a negative number and vice versa. The amount of saved energy may increase by the number of bits used to represent each data. For modules using sign-magnitude data representation, separate modules may be used to process positive and negative data because circuits which may operate with sign-magnitude data may be complicated and power hungry. In some embodiments, circuits used in the module configured for handling positive data may be similar to or different from the circuits used in the module configured to process negative data depending on the selected data representation.

In some embodiments, the positive and/or negative modules may also include a dedicated hardware for accelerating the execution of dot product operation or any operation which can be expressed based on dot products such as vector-by-matrix, matrix-by-matrix, tensor-by-tensor multiplications. The dedicated dot-product engine may perform the element-wise multiplication between the elements of the two input vectors to produce multiplication results and add the multiplication results together using two separate N-input adders, one used to add positive results and the other one for adding negative results. The results of these two adders may then be subtracted from one another to generate the final result of the dot product operation. Separation of additions between positive and negative numbers may reduce the power consumption of the engine by minimizing the switching activities of circuits inside the adders especially if the input data are highly correlated and/or if the results of the multiplications have small amplitudes. This configuration may be beneficial for data representations such as 2's complement in which a change in sign may flip many bits in the data. The multiplication used in the engine may be a general multiplier multiplying two N-bit numbers together or may be a bit-partitioned multiplication in which one input has been broken into multiple partitions, each partition having a smaller number of bits than each N-bit number. Higher power consumption savings may be achieved by increasing the resolution of the input data in terms of the number of bits.

In some modules (e.g., accelerators) designed to implement operations, such as dot product or other operations which can be expressed as dot product, a dedicated multi-input adder may accelerate the summation between the results of element-wise multiplications of elements of vectors involved in the dot product operation. The same multi-input adder may be used to accelerate the execution of any other operation including summation of multiple numbers. Instead of using one or more accumulators to add these data together sequentially using sequential logic circuits, the module may implement the whole or part of the adder using combinational circuits without hardware reuse to reduce the power consumption of the circuit for highly correlated input data. The adder may add N input data represented by any data representations or positive and negative inputs separately. For adding inputs separately, two similar circuits with the same N number of inputs may be used. Based on the sign of each input, it may be routed to either the positive circuit or the negative circuit. If an input is routed to the positive circuits, the corresponding input in the negative circuit may be set to zero.

In some embodiments, the multi-input adder may be implemented using smaller adder circuits in multiple stages before the final summation result is produced (for example using tree-like structure). While the early adders may be simpler and faster, overall, they may consume more power because of their large quantity. By going deeper into the adder structure, the number of adders may decrease but due to their higher complexity, they may become slower. In this configuration, the total power of the multi-input adder may be further reduced by operating the adders in each stage at different operating voltages. Simple adders at the early stages may be biased with lower voltages to reduce their power consumption while larger voltages may be used to bias larger adders deep inside the structure. Because most of the time required for the signal to propagate through the adder structure from input to output may be spent in complex adders deep inside the structure, lowering the speed of small adders at the early stages of the adder structure due to the reduction in operating voltage may not impact the overall speed of the multi-input adder circuit. This multi-VDD design methodology may not be limited to the multi-input adder function and any other operation which can be implemented similarly at multiple stages may benefit from this design methodology.

If the application being executed in the data processing system can tolerate more imprecise computation like deep neural networks and machine learning algorithms, the power consumed inside the data processing system executing these data-intensive applications may be reduce even further by reducing the precision of internal computations and implementing the computations which may have more significant impact on the final results of the computations. This may be achieved without reducing the resolution and accuracy (e.g., number of bits) of inputs and outputs of the accelerator, which may degrade the overall performance of the application significantly. In some embodiments, one or more internal computations may be ignored and/or discarded for internal computations performed at precisions higher than the precisions associated with the final output. In these and other embodiments, power may be saved by ignoring and/or discarding the one or more internal computations because the internal computations may have negligible impact on the output accuracy and/or the performance of the underlying application especially if the application can tolerate imprecise computation (e.g., deep neural networks and machine learning applications).

The data processing system may perform approximate computation without reducing the precision of input and output signals by first bit-partitioning the input signals and treating the computations related to Least Significant Bits (LSB) and Most Significant Bits (MSB) differently. While the data processing system may perform the computations which may only affect the LSB bits of final results at lower precision, the data processing system may perform computations having the most impact on the MSB bits of the final output at higher precision. Errors introduced into the computation due to the execution of a LSB portion of the result at lower precision may only affect the LSB bits of the final result and may therefore have little impact on the performance of the application. The data processing system may adjust the precision at which each computation may be executed based on the maximum acceptable error at the output.

In some embodiments, the data processing system may perform an approximate dot product operation between two vectors by performing the summation of partial products of the element-wise multiplications between elements of the vectors at different precisions depending on their impact on the final result to reduce the power consumption of the chip. While the data processing system may perform the summation between the partial products generated from the LSB bits of the inputs at lower precisions, the data processing system may perform the summation between the partial products generated from the MSB bits of the inputs at the highest accuracy. The summation of partial products may be performed at lower precisions by setting one or more of the least significant bits of the input partial products to zero. The accuracy of the summation may decrease and the amount of power saved may increase as more LSB included in one or more of the partial products bits are set to zero. The number of LSB bits to set to zero may depend on a number of bits in the final output, a number of partial products being added together, a desired final accuracy, a number of bits in the original inputs, etc.

The data processing system with adjustable accuracy may be used to implement different layers of deep neural networks at different precisions. Layers of the network sensitive to the accuracy of the computation may be executed at higher precision while layers which can withstand errors may be computed at lower precision to save power.

In the present disclosure, reference to "data processing systems" may include any arrangement of software and/or hardware that may be configured to perform one or more operations on data. As such, the term "data processing system" may refer to an overall processing system that includes multiple different modules (e.g., accelerators) configured to perform data processing operations. Additionally or alternatively, each module may be considered a data processing system. Similarly, use of the term "accelerator" may refer to a single accelerator or an accelerator module that may include multiple sub-accelerators included therein. Further, in some instances, reference to examples of specific types of data processing system implementations (e.g., accelerators, Arithmetic Logic Units, etc.) are not limiting and are given merely as examples. As such, reference to a specific type of implementation for a particular element is not limiting and may be analogous to any other suitable implementation for such element.

FIG. 1 illustrates a data processing system 100 for working with data representations different from those used outside of the system. The system may include a processing unit 101 which communicates with a memory unit 104 to read and store data. The processing unit 101 may include a control unit 102 controlling all the modules and data flow and an Arithmetic Logic Unit (ALU) or an accelerator 103 which may be used to process the data by executing logical or mathematical functions on the data. The data processing system 100 may communicate with external systems using an input port 106 and an output port 107.

The processing unit 101 may include code and routines configured to enable a computing system to perform one or more operations related to training and implementing a machine learning model. Additionally or alternatively, the processing unit 101 may be implemented using hardware including a processor, a microprocessor (e.g., to perform or control performance of one or more operations), a field-programmable gate array (FPGA), or an application-specific integrated circuit (ASIC). In some other instances, the processing unit 101 may be implemented using a combination of hardware and software. In the present disclosure, operations described as being performed by the processing unit 101 may include operations that the processing unit 101 may direct a corresponding system to perform. The processing unit 101 may be configured to perform a series of operations with respect to the input data 106 and/or input data converted into a particular data representation format by data representation converter 105a.

The data representation converter module 105a and 105b may include code and routines configured to enable a computing system to perform one or more operations related to training and implementing a machine learning model. Additionally or alternatively, the data representation converter module 105a and 105b may be implemented using hardware including a processor, a microprocessor (e.g., to perform or control performance of one or more operations), a field-programmable gate array (FPGA), or an application-specific integrated circuit (ASIC). In some other instances, the data representation converter module 105a and 105b may be implemented using a combination of hardware and software. In the present disclosure, operations described as being performed by the data representation converter module 105a and 105b may include operations that the data representation converter module 105a and 105b may direct a corresponding system to perform. The data representation converter module 105a and 105b may be configured to perform a series of operations with respect to the input data 106.

The data processing system 100 may also include a data representation converter module 105a and 105b to digitally change the way the input is represented or encoded when entering the system or leaving the system. Input or output data may be represented in different formats such as 1's complement, 2's complement, sign-magnitude, etc. The data representation converter module 105a and 105b may be used responsive to data representation outside of the chip being different than the data representation used inside the chip. For example if particular circuits outside of the data processing system 100 are designed to work with data represented as 2's complement while the data processing system 100 is designed to work with sign-magnitude data representations, the data representation converter module 105 may convert the data entering the chip from 2's complement to sign-magnitude data representations and vice versa. Data representation conversion facilitated by the data representation converter module 105 may improve performance in terms of speed, simplicity, area, power consumption, throughput, etc.

In some embodiments, the internal circuits of the computing system 100 may be working with a same data representation. In these and other embodiments, different parts may be implemented based on different data representations. In the latter case, data representation conversion may convert data being obtained from or sent to modules communicating with each other but using different data representation methods.

In some embodiments where the data processing system 100 may execute the computations of data-intensive applications such as deep neural networks and/or machine learning algorithms in which the data are highly correlated and/or have Gaussian-like distribution centered around zero, the computing system of 100 may be designed to work with sign-magnitude data representations to reduce the power consumed to implement the application and its corresponding computations as well as the power consumed in data bus to transfer data around the chip.

Figure 2:
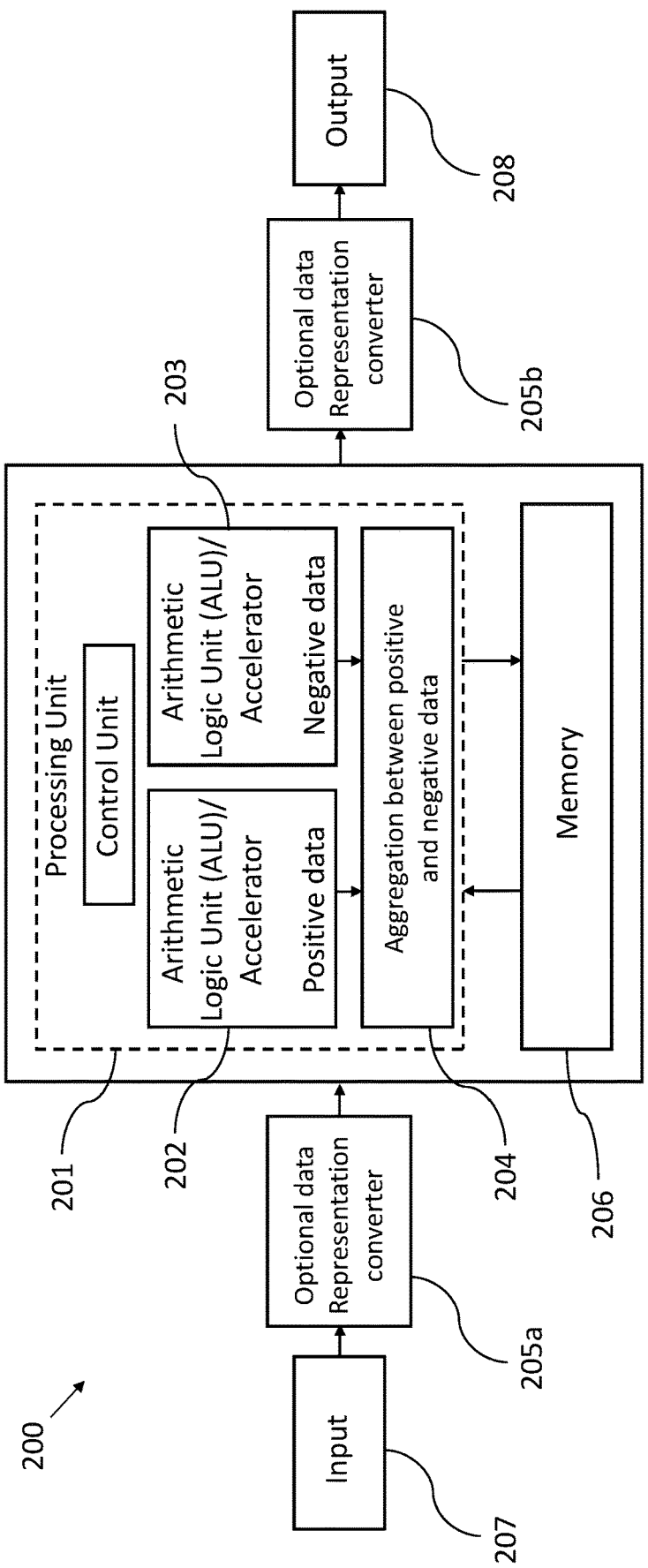
FIG. 2 illustrates a digital computing architecture in which positive and negative data are processed separately.

FIG. 2 illustrates a data processing system 200 including a processing unit 201 that separates the computations between positive and negative data to reduce the power consumed within the system. The processing unit 201 may have one ALU/accelerator to process positive computations 202 and one ALU/accelerator to process negative computations 203.

The ALU/accelerator to process positive computations 202 and the ALU/accelerator to process negative computations 203 may include code and routines configured to enable a computing system to perform one or more operations related to training and implementing a machine learning model. Additionally or alternatively, the ALUs/accelerators 202 and 203 may be implemented using hardware including a processor, a microprocessor (e.g., to perform or control performance of one or more operations), a field-programmable gate array (FPGA), or an application-specific integrated circuit (ASIC). In some other instances, the ALUs/accelerators 202 and 203 may be implemented using a combination of hardware and software. In the present disclosure, operations described as being performed by the ALUs/accelerators 202 and 203 may include operations that the ALUs/accelerators 202 and 203 may direct a corresponding system to perform. The ALUs/accelerators 202 and 203 may be configured to perform a series of operations with respect to the input data 207 and/or input data converted into a particular data representation format by data representation converter 205a.

There may also be an aggregation unit 204 to aggregate the results produced by positive and negative accelerators 202 and 203. The processing unit 201 may be using a specific data representation format (e.g., 2's complement) which may result in switching large number of bits when switching the data from positive to negative and larger power consumption. In some other embodiments, the processing unit 201 may use a specific data representation format (e.g., sign-magnitude) in which the implementation of a single hardware that can process both positive and negative numbers in that specific data representation format may be complicated and inefficient. In these situations, and whenever it is possible, the processing unit 201 may separate the data-intensive computations between positive and negative accelerators 202 and 203 and execute the computations separately. The final result may be produced later by aggregating the results of positive and negative accelerators.

The aggregation unit 204 may include code and routines configured to enable a computing system to perform one or more operations related to training and implementing a machine learning model. Additionally or alternatively, the aggregation unit 204 may be implemented using hardware including a processor, a microprocessor (e.g., to perform or control performance of one or more operations), a field-programmable gate array (FPGA), or an application-specific integrated circuit (ASIC). In some other instances, the aggregation unit 204 may be implemented using a combination of hardware and software. In the present disclosure, operations described as being performed by the aggregation unit 204 may include operations that the aggregation unit 204 may direct a corresponding system to perform. The aggregation unit 204 may be configured to perform a series of operations with respect to the input data 207 and/or input data converted into a particular data representation format by data representation converter 205a.

In some embodiments, separating the computations between positive and negative parts may reduce the power consumption for highly correlated data.

Different data representations like 2's complement, 1's complement, sign-magnitude, etc. may be used to implement the data processing system 200.

In some embodiments, the data processing system 200 may also include the optional data representation conversion module 205a and 205b to convert the format of input data 207 coming to the chip and/or output data 208 leaving the chip responsive to input data 207 having a different data format than the data included in the computing data processing system 200. In these and other embodiments, the input data 207 and the output data 208 may have the same or a similar data format. Additionally or alternatively, the input data 207 and the output data 208 may have dissimilar data formats.

In some embodiments, the separation of positive and negative computations may be performed to also reduce the power consumed to move the data around within the same chip.

In some embodiments, the same accelerator may be used at different times to process positive parts and negative parts of the computation. In these and other embodiments, two or more separate accelerators may be used to perform positive computations and negative computations in parallel.

In some embodiments, the system 200 may also include a separate accelerator to implement operations which cannot be separated to positive and negative portions.

In some embodiments, the memory module 206 may handle positive and negative numbers similarly. In these and other embodiments, special memory modules may be used for storing positive and/or negative numbers in a given data representation format to improve the performance of the whole system.

The memory module 206 may include code and routines configured to enable a computing system to perform one or more operations related to training and implementing a machine learning model. Additionally or alternatively, the memory module 206 may be implemented using hardware including a processor, a microprocessor (e.g., to perform or control performance of one or more operations), a field-programmable gate array (FPGA), or an application-specific integrated circuit (ASIC). In some other instances, the memory module 206 may be implemented using a combination of hardware and software. In the present disclosure, operations described as being performed by the memory module 206 may include operations that the memory module 206 may direct a corresponding system to perform. The memory module 206 may be configured to perform a series of operations with respect to the input data 207 and/or input data converted into a particular data representation format by data representation converter 205a.

Figure 3:
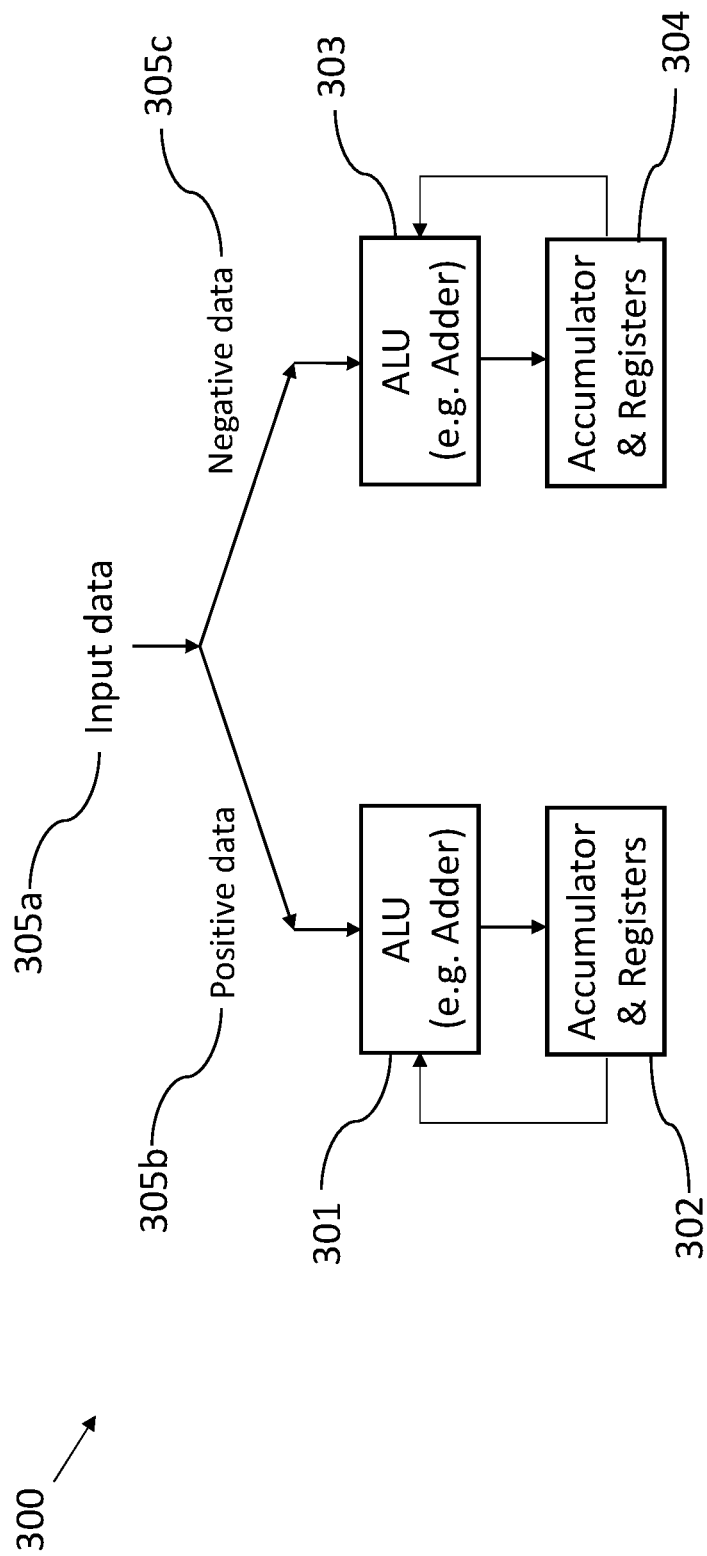
FIG. 3 illustrates an example of arithmetic logic unit like accumulator processing positive and negative results separately.

FIG. 3 illustrates an example of a computing system 300 in which positive data and negative data may be processed independently. The computing system 300 may have an ALU module 301 and the accumulator and registers unit 302 to process positive data and a separate ALU module 303 and the accumulator-and-registers unit 304 to process negative data. In some embodiments, the incoming data 305a may first be categorized as positive data 305b or negative data 305c, for example, by checking the MSB bit for data represented in 2's complement format or by checking the sign bit for data represented in sign-magnitude format. The positive data 305b may be sent to the accelerator for processing positive data, and negative data 305c may be transferred to the accelerator for handling negative numbers. Different operations may be applied to the incoming data in each of the accelerators. Final results may be produced by the aggregation of the results generated by the positive accelerator and the negative accelerator.

In some embodiments, the computing system may be used to perform the accumulation of a sequence or stream of data. In this configuration, positive data 305b in the data stream may be added together in a positive accumulator while the summation of negative data 305c are performed in a negative accelerator and accumulator. Performing the summation of positive data 305b and negative data 305c separately may reduce the power consumption by preventing the frequent switching of internal nodes and bits of the accumulator due to the switching of the sign of the accumulation result. If incoming data samples are highly correlated, data entering each of the accelerators may also be highly correlated, which may reduce the switching of bits between subsequent data samples and result in further power saving.

In some other embodiments, functions other than accumulation may also be implemented in the computing system 300 with separate positive and negative accelerators if the operation can be separated into positive parts and negative parts.

Figure 4:
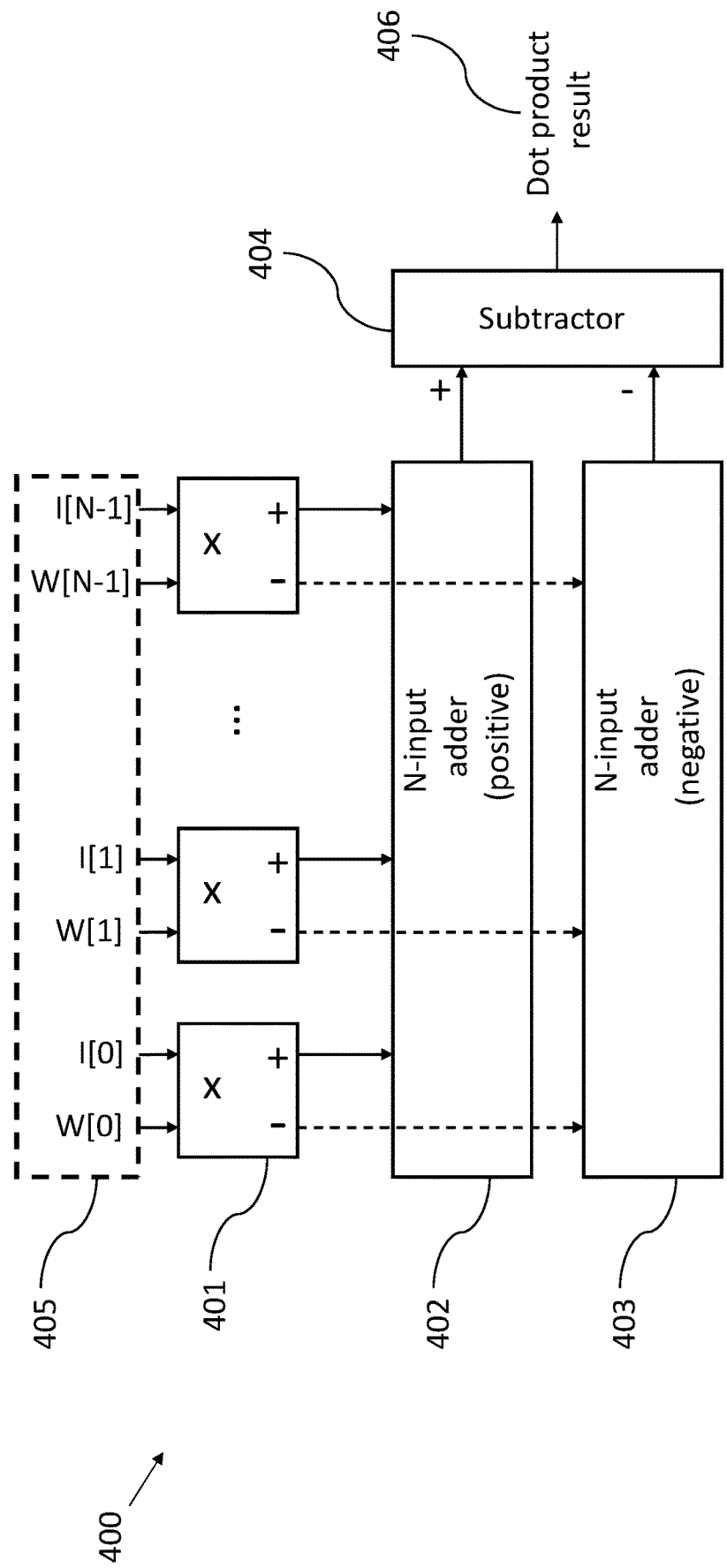
FIG. 4 illustrates an example of dot product engine where positive and negative multiplication results are accumulated separately.

FIG. 4 illustrates an example of a system 400 designed to accelerate the execution of a dot product operation between input vectors I and W 405 using separated circuits to handle positive and negative parts of the computation. Elements of input vectors I and W may first be multiplied together using a multiplier module 401. The results of these element-wise multiplications may be summed to produce the result of the dot product operation 406. Instead of directly adding the element-wise multiplication results together, separate accumulators or adders may be used to add intermediate multiplication results. The outputs of the multiplier modules 401 may be sent to either the positive adder 402 or negative adder 403 based on the sign of the result of the multiplication. The N-input adders may add all the inputs together. The result of the dot-product operation 406 between vectors I and W 405 may then be calculated by subtracting the results of these positive and negative adders using the subtractor module 404. Separately performing the summation between positive and negative multiplication results may reduce the switching activities inside the adders due to the fixed and similar sign of inputs resulting in remarkable power saving. The amount of power saving may be larger if elements of input vectors has more bits, or if the multiplication results has smaller amplitudes, or if the input vectors has more elements, or if the samples of input vectors 405 processed on after another using this accelerator are highly correlated.

In some embodiments, the dot-product accelerator may be implemented with fully combinational circuits without any hardware reuse to maximize the power saving by minimizing the switching activities of internal nodes when the circuit will be used to process a stream of highly correlated data samples like implementing the operations seen in applications like deep neural networks and/or machine learning algorithms.

The power saving may be achieved independent of how the multiplier 401 and the adder 402 or 403 is implemented in hardware and their corresponding architecture and the format by which data is represented (e.g. 2's complement, 1's complement, sign-magnitude, etc.). In the case where data is represented as sign-magnitude, positive computations and negative computations may be separated to simplify the underlying circuits since it may allow the implementation of the hardware using the circuits developed for 2's complement data format.

In some embodiments, separate multiplier modules 401 may be used for positive computations and negative computations.

Figure 5:
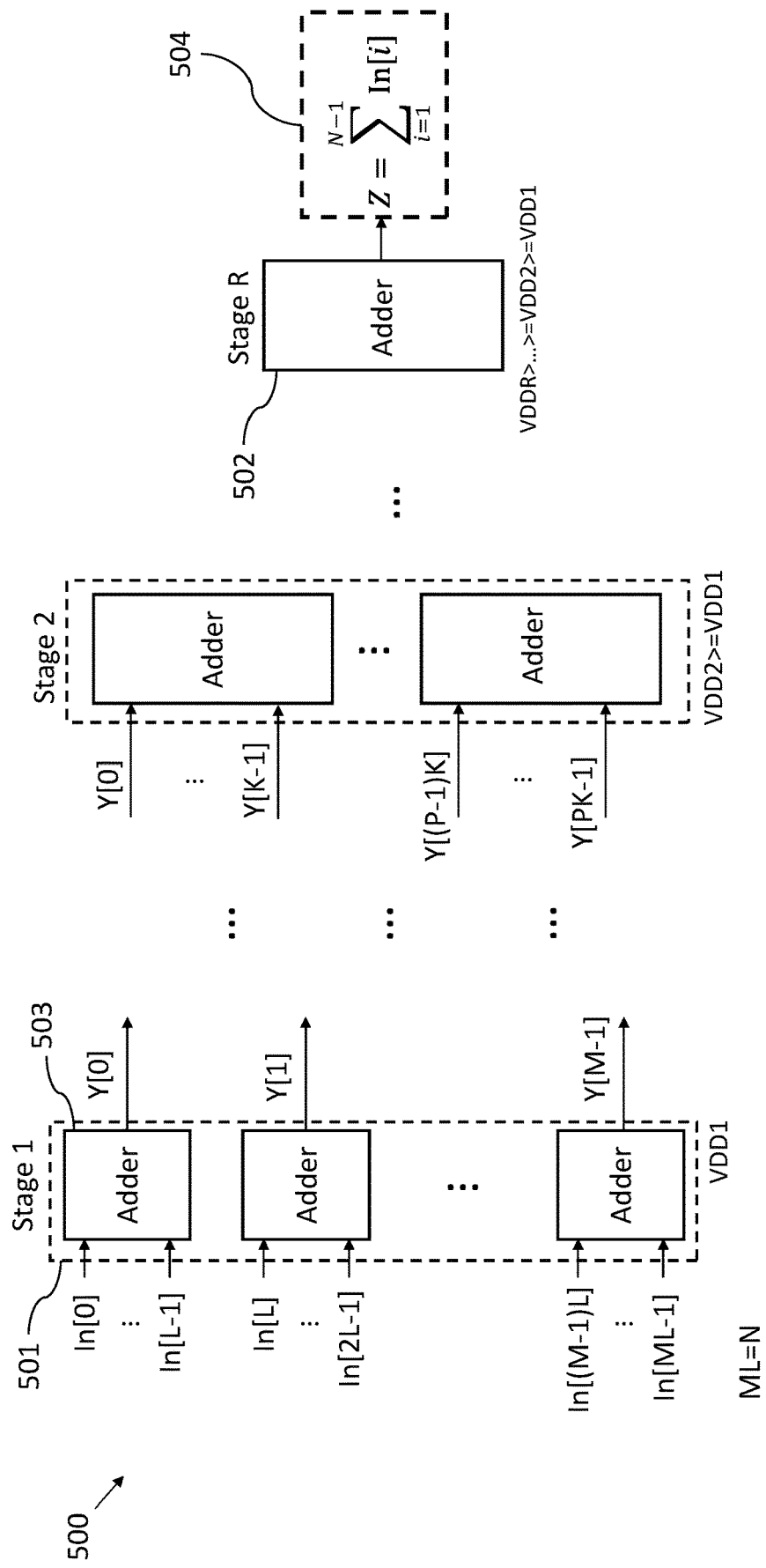
FIG. 5 Illustrates an example of multi-VDD design of a N-input adder.

FIG. 5 illustrates an example of multi-VDD N-input adder with tree-like structure which may be used to add multiple positive or negative numbers together. The multi-input adder 500 may be implemented by first partitioning inputs into smaller sets each having L inputs and then adding the L inputs in each set together using small but fast adders 503 forming the first stage of adders 501. Adders 503 used in the first stage 501 may receive L inputs each having Q bits and produce the output Y[i] which may have at most Q+log 2(L) bits. Due to the small number of bits the adders have in the first stage, these adders may have small footprints, be fast, and consume low power. However, the power consumed in the first stage may be large due to the large number of adders in this stage. The addition results produced by the adders of the first stage may be partitioned into smaller sets and separate adders in the second stage may add the inputs in each partition together similar to in the first stage. The adders used in the second stage may be larger and slower adders compared to the adders used in the first stage because they are adding input signals with Q+log 2(L) input bits. Although each adder in the second stage may be consuming more power than any individual adder in the first stage, the total power consumed by the adders of the second stage may be less than the power consumed by the adders in the first stage due to the smaller number of adders in the second stage. The stages of adders may be cascaded one after another until the last stage in which the final addition result 504 may be produced using a last adder 502. The last adder 502 may have the largest propagation delay and may consume the most power compared to the other adder modules but the overall power consumed in the last stage may be less than the power consumed in any of the other stages because there is a single adder in the last stage. The final addition result 504 may be represented as Z and may be calculated according to the following equation in which In[i] may represent the inputs obtained by the last adder 502:

$$Z = \sum_{i=1}^{N-1} In[i]$$

In some embodiments, to lower the power consumed by lowering the switching activities of internal nodes, two N-input adder systems 500 may be used in parallel to sum up the given N inputs by first separating the inputs based on their sign and then adding all the non-negative input signals in one circuit and the remaining negative inputs in another N-input adder system. The power may be reduced even further if the input signals being applied to the same input terminal of the N-input adder over time are highly correlated.

In some embodiments, inputs applied to the adder may have a 2's complement, 1's complement, sign-magnitude, or any other formatting.

In some embodiments, a single N-input adder 500 may be used to add N positive and/or negative inputs together. The power consumed to perform the addition may be reduced if the circuit is used to proceed large set of highly correlated inputs.

The circuit of 500 may be implemented using a fully-combinational circuits to take maximum advantage of correlation between consequent data entering the adder to lower the power consumption and remove the power consumed in sequential circuits and the associated clock tree.

Different adder architectures may be used to implement the multi-input adder system 500. This includes at least one of a Ripple Carry Adder (RCA), Carry Skip Adder (CSkA), Carry Increment Adder (CIA), Carry Look Ahead Adder (CLA), Carry Save Adder (CSA), Carry Select Adder (CSlA), or Carry Bypass Adder (CBA).

In some embodiments where the output resolution may be reduced substantially at the end of the N-input adder or when the sum of inputs can be calculated approximately, intermediate adders or the results of additions at different stages may be performed at lower precisions for example by setting the LSB bits of the addition results to zero to save more on power. The number of LSB bits to set to zero may depend on the final precision, number of bits of inputs, number of input signals, etc.

In some embodiments, to save power without affecting the throughput of the system, different stages of the multi-input adder/accumulator circuit 500 may be biased at different voltages with the last stage having the highest voltage and the first stage biased with the lowest voltage. Lowering the operating voltages of adders in early stages may reduce the power consumed in these stages considerably while it may increase their propagation delays. Since most of the power in the circuit 500 may be consumed in the early stages but the most propagation delay may belong to the final stages, lowering the operating voltages of early stages may reduce the power of the whole circuit without a noticeable increase in the total input-to-output propagation delay of the circuit.

Figure 6:
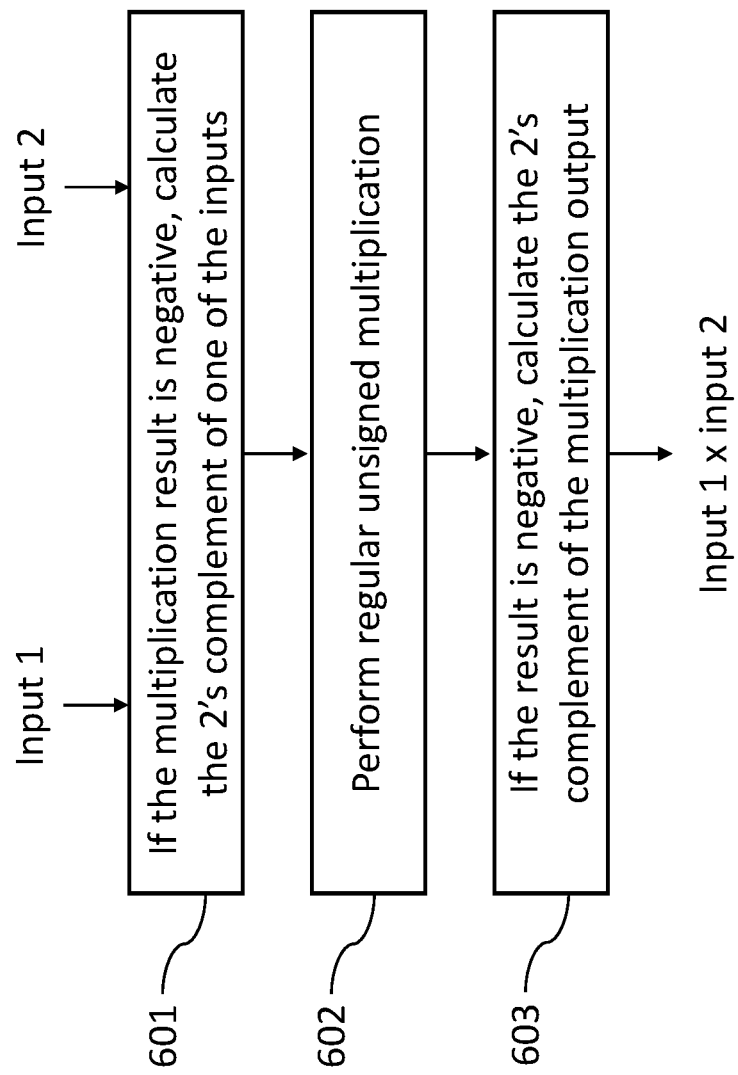
FIG. 6 illustrates an example of implementing a multiplier where its inputs are always non-negative.

FIG. 6 illustrates an algorithm which may be used to reduce the power consumed to perform multiplication between two signed numbers represented in 2's complement format. To perform a signed multiplication between two given inputs, in stage 601 the signs of both inputs may be checked and if the inputs have different signs, the sign of one of the inputs may be switched by calculating its 2's complement. In the next step, in stage 602, the unsigned multiplication between the two inputs (outputs of stage 601) may be performed which may result in having most of the MSB bits staying at zero if both inputs have small amplitudes (e.g. Gaussian-like distribution centered around zero). Finally at stage 603, the 2's complement of the final result may be calculated responsive to the sign of one of the inputs at stage 601 being switched. Calculating the 2's complement of the final result may ensure the output has the right sign. Being able to always perform an unsigned multiplication may lower the power consumed in the accelerator because most of the internal MSB bits may remain at zero even if inputs change signs constantly.

Figure 7:
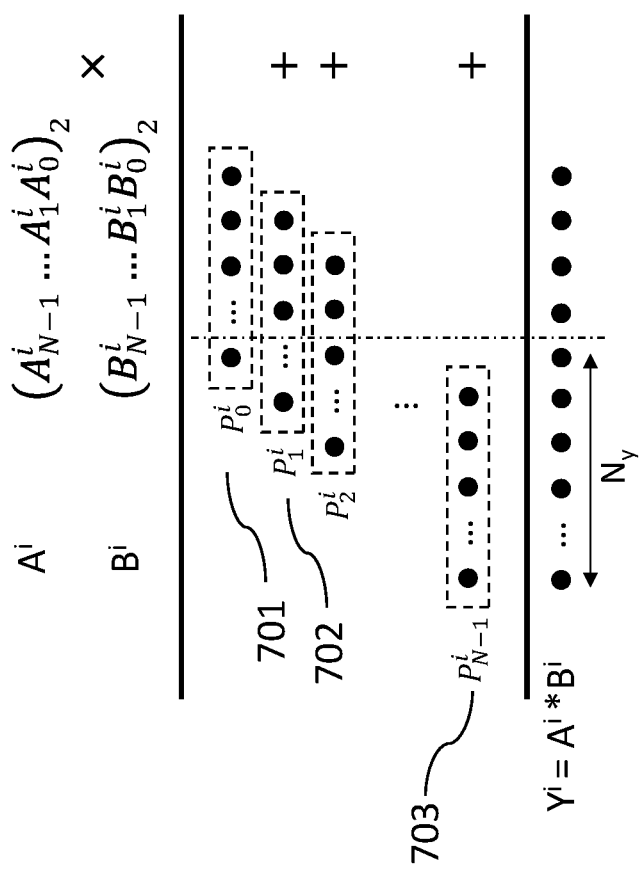
FIG. 7 illustrates the methodology of calculating partial products at lower precisions when the resolution of output result will be reduced to Ny bits.

FIG. 7 illustrates how the partial products may be calculated at lower precision if the resolution of the result of the multiplication between two numbers may be reduced at the end to Ny bits and the underlying application can tolerate or accept approximate computation of the multiplication operation. In some embodiments, a final multiplication result of input vectors $A^i$ and $B^i$ may be represented by $Y^i$. In this situation, since most of the LSB bits of the final multiplication result may be thrown away to reduce the result to $N_y$ bits, different partial product may be calculated at different but lower precision without having noticeable impact on the final multiplication result. The precision at which each partial product may be calculated may depend on its importance and impact on the final result. For example, the first partial product 701 may have the least importance while the last partial product 703 may have the highest importance because each partial product may be shifted to the left by one compared to the previous partial product (e.g., partial product 702 is shifted to the left by one step when compared to partial product 701). The least significant partial products may be calculated at lower precision, for example, by not calculating the LSB bits associated with the least significant partial products at the first place and setting them to zero. The LSB bits of the input operands may be set to zero before performing the computations for calculating these partial products. The number of LSB bits to ignore in each partial product may depend on the importance of that partial product, the number of bits in each partial product, the value of $N_y$, and/or a threshold level of error in the multiplication result.

The methodology of calculating partial products may be expanded to the dot product operation or any operation which can be expressed based on dot product operation to perform the dot product imprecisely or approximately to save power. Each dot product may be written as a summation of element-wise multiplications between elements of the two input vectors where multiplications may be written as partial products. Therefore, the dot product may be written as a summation between the partial products calculated for the element-wise multiplications between vector elements as:

$$Z = \sum_{i=1}^{K} X^i W^i = \sum_{i=1}^{K} Y^i = 2^{N-1} \left( \sum_{i=1}^{K} P^i_{N-1} + \cdots + 2^{-N+2} \sum_{i=1}^{K} P^i_1 + 2^{-N+1} \sum_{i=1}^{K} P^i_0 \right)$$

where Z is the dot product result, X and W are the two input vectors, and $P_j^i$ is the jth partial product in the multiplication between $X^i$ and $W^i$. In this equation, the gain of each term illustrates the importance of that set of partial products on the final dot product result. For example, the set of partial products Po has the least importance because they have the smallest gain $2^{-N+1}$. The importance of these partial products may be further reduced if the resolution of the final dot product may be reduced to lower number of bits like $N_y$ (for the sake of simplicity, the resolution of dot product output is assumed to be equal to the resolution of input vectors X and W and all equal to N). To reduce the resolution of output to N bits we may calculate:

$$Z_{N_y=N} = \text{round}\left( \frac{2^N}{2^{2N+\log_2(K)}} Z \right)$$

$$= \text{round}\left( \frac{2^{2N-1}}{2^{2N+\log_2(K)}} \left( \sum_{i=1}^{K} P^i_{N-1} + \cdots + 2^{-N+2} \sum_{i=1}^{K} P^i_1 + 2^{-N+1} \sum_{i=1}^{K} P^i_0 \right) \right)$$

$$= \text{round}\left( \frac{1}{2^{\log_2(K)+1}} \sum_{i=1}^{K} P^i_{N-1} + \cdots + \frac{1}{2^{\log_2(K)+N-1}} \sum_{i=1}^{K} P^i_1 + \frac{1}{2^{\log_2(K)+N}} \sum_{i=1}^{K} P^i_0 \right)$$

In some embodiments, the dot product between two vectors may be calculated at lower precision or approximately by not calculating the least important partial products at all due to their negligible impact on the LSB bits of the dot product output. In some other embodiments, different partial products may be calculated at different precisions based on the importance of the different partial products. A particular partial product may be calculated at lower precision, for example, by calculating the MSB bits of the partial product and setting the LSB bits to zero.

The disclosed methodology of calculating dot product or any other operation which may be expressed based on dot product such as vector-by-matrix, matrix-by-matrix, and/or tensor-by-tensor multiplication approximately may be used to reduce the power consumed to execute these operations in applications such as deep neural networks and machine learning algorithms which can tolerate imprecise or approximate computations.

The accuracy at which the dot product may be calculated may be adjusted by changing the precisions at which partial products may be calculated.

Figure 8:
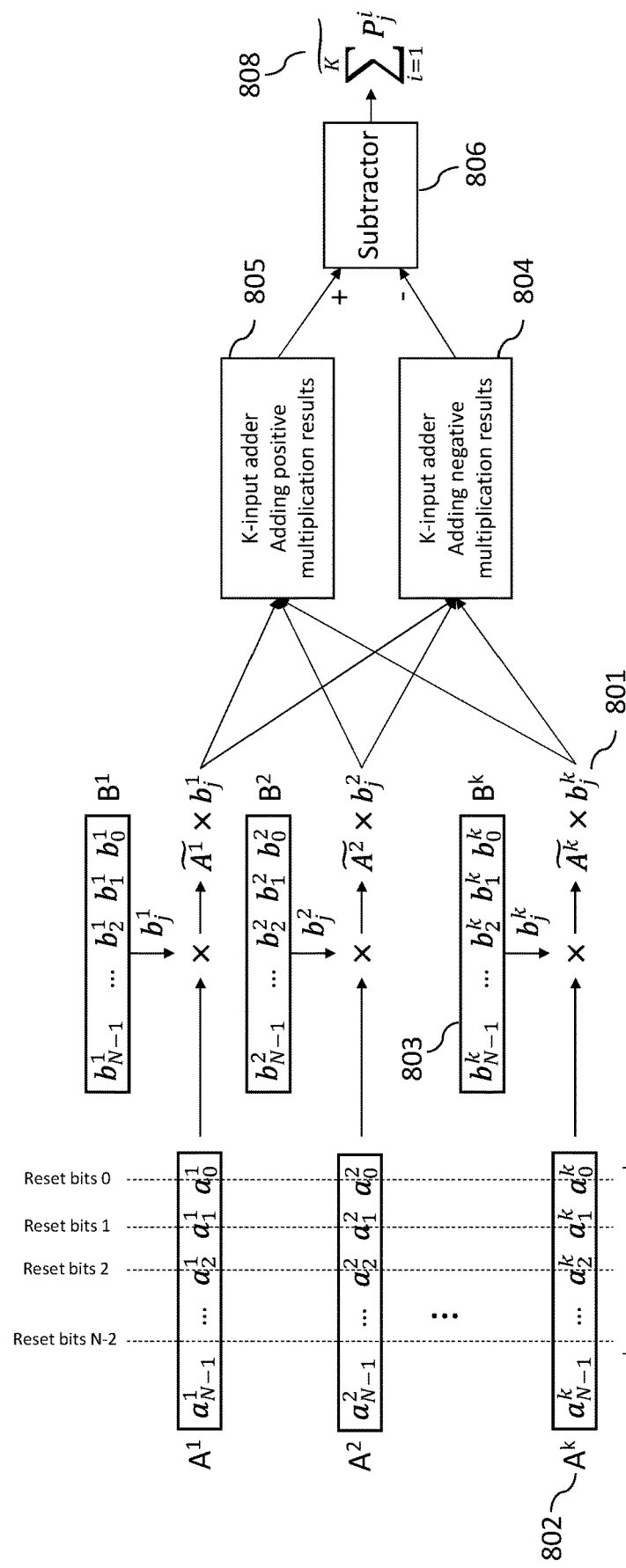
FIG. 8 illustrates an example of implementing partial products at lower precision when implementing any operation which can be expressed based on dot products.

FIG. 8 illustrates how a sum of partial products $P_j^i$ 808 (i.e., $\Sigma_{i=1}^{K} P_j^i$) may be calculated at lower precision or approximately with adjustable precision and separated positive accumulators and negative accumulators. The partial products 801 equal to $P_j^i$ may be calculated by the multiplication between the operand $A^i$ 802 and the jth bit of operand $B^i$ 803 i.e. $b_j^i$ where $A^i$ and $B^i$ are the ith element in interchangeable input vectors A and B on which the dot product is executed. Including the sign of element $B^i$, the result of multiplication between $b_j^i$ and $A^i$ may be equal to either of $\{0, A^i, -A^i\}$ values that can be calculated without using any multiplier. Therefore, the calculation of dot product may be reduced to the summation of these intermediate partial products. Because the partial products may have positive and negative values, the summation of the partial products 808 may be performed using two K-input adder circuits 804 and 805 to reduce the power, one K-input adder circuit for summing the non-negative inputs and one K-input adder circuit for summing the negative inputs. Responsive to a particular calculated partial product being positive, an input corresponding to the particular calculated partial product in the other adder may be set to zero. The final result of the calculation $\Sigma_{i=1}^{K} P_j^i$ may be computed by subtracting the outputs of the two adders using a subtractor module 806. Calculated partial products may then be scaled based on their importance and the position of $b_j^i$ in the vector element $B^i$ and summed up to produce the final result 808 of the dot product between the two input vectors.

In some embodiments, the same circuits may be used to calculate different sums of partial products corresponding to different input bit $b_j^i$. In these and other embodiments, different circuits may be used for the calculation of the sum of partial products per each input bit $b_j^i$ to save power when input data are correlated. In some embodiments, the sum of partial products 808 and therefore the corresponding dot product may be calculated approximately by setting some of the LSB bits of input vector elements $A^i$ to zero using the accuracy control signals 807. The number of bits to set to zero may depend on the precision at which the final dot product 808 may be calculated at, the statistics of signals A and B, number of bits in vector elements $A^i$ and $B^i$, the maximum power budget of the system, the tolerance of underlying application to imprecise computation, etc. While more LSB bits may be set to zero when computing the summation of the least important partial products, the number of LSB bits set to zero may decrease as we move toward the calculation of the summation of the most important partial products. The accuracy of calculation may be adjusted based on a particular problem being solved.

In some embodiments, the partial products may be calculated for every two consequent bits of the vector elements $B^i$ to simplify the circuits further. In this situation, the possible results of the multiplication or partial products may be $\{-3A^i, -2A^i, \_A^i, 0, A^i, 2A^i, 3A^i\}$, which may be calculated in advance without using any multiplier. This method may result in additional power saving especially if these precalculated values may be shared and used to calculate different partial products or dot products, such as in performing matrix multiplication in which the inputs are shared between all columns of the matrix.

The summation of different partial products may be calculated using the same circuit. Additionally or alternatively, different circuits may be operated in parallel to calculate the summation of different partial products in parallel. The latter case may be used in applications such as deep neural networks with highly correlated data to improve the power saving.

In some embodiments, vector elements may be represented using 1's complement, 2's complement, or sign-magnitude format.

In some embodiments, the vector elements $B^i$ and $A^i$ may have the same or similar resolutions. In these and other embodiments, elements of these vectors may be represented by different numbers of bits. The disclosed methodology may be used to perform the dot product between the two vectors with any number of elements. The higher the number of elements, the higher may be the saving in performing the dot product approximately and the more LSB bits may be set to zero in the calculation of the sum of partial products without having large impact on the final dot product result.

In some embodiments, a single adder circuit may be used to replace the positive and negative adders 804 and 805.

In some embodiments and some applications like deep neural networks where the power consumed within the disclosed computing system depends on the statistics and/or distribution of data, hardware-aware training may be used to adjust the distribution of feature map and weight data to lower the power consumption of the hardware for example by reducing the amplitude of these signals.

Figure 9:
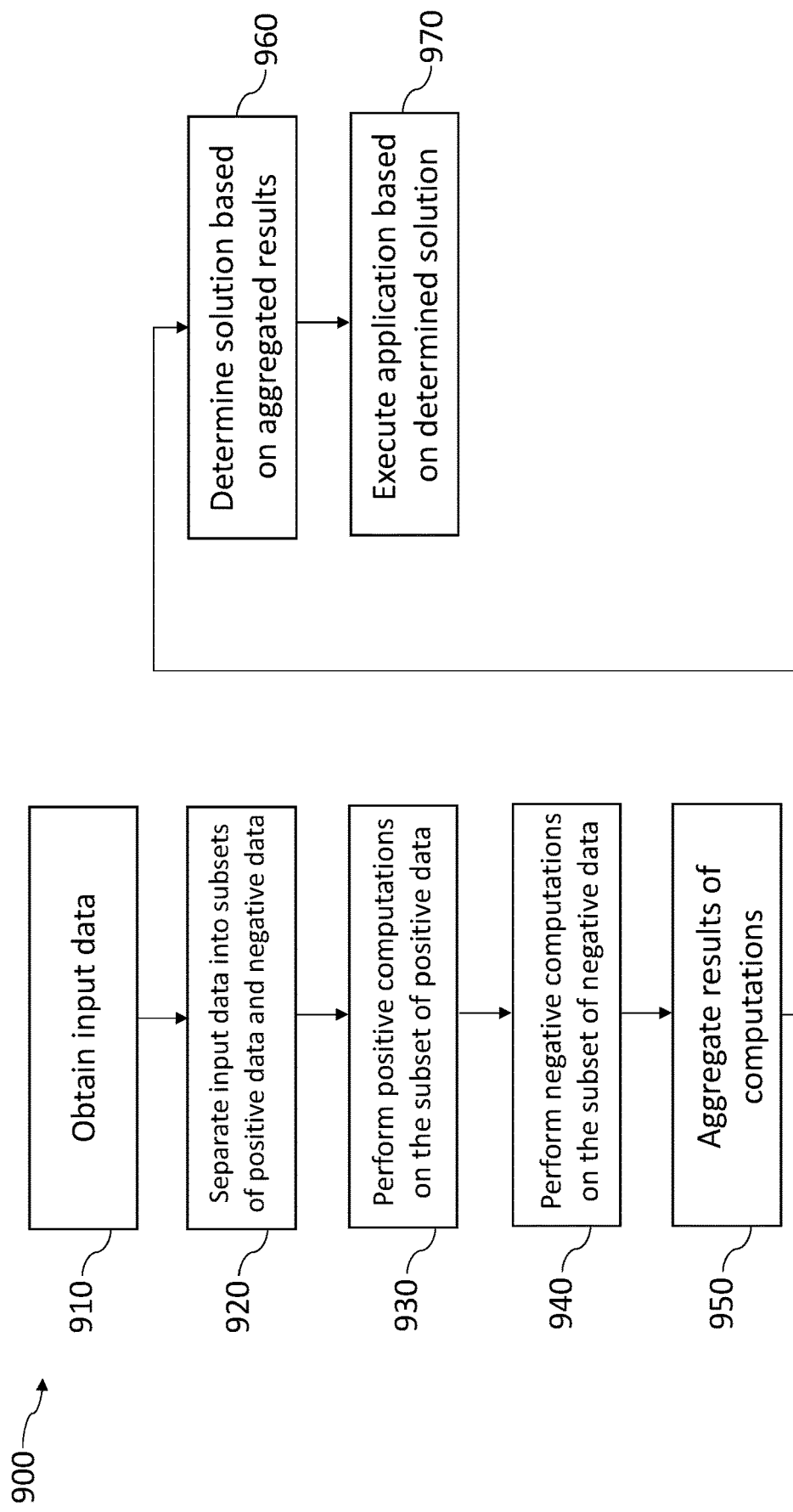
FIG. 9 is a flowchart of an example method for processing data more efficiently by separating positive and negative computations.

FIG. 9 is a flowchart of an example method 900 of a system in which all or part of the positive and negative computations are performed separately. The method 900 may be performed by any suitable system, apparatus, or device. For example, the system 100, the processing unit 101, the control unit 102, the ALU 103, the memory unit 104, and/or the data representation converter 105a and 105b may perform one or more of the operations associated with the method 900. Although illustrated with discrete blocks, the steps and operations associated with one or more of the blocks of the method 900 may be divided into additional blocks, combined into fewer blocks, or eliminated, depending on the particular implementation.

At block 910, input data may be obtained. The input data may be obtained as described in the present disclosure.

At block 920, the input data may be separated into a subset of positive data and a subset of negative data, the first subset of input data including positive input data and the second subset of input data including negative input data. The input data may be separated as described in the present disclosure.

Additionally or alternatively, separating the input data may include separating the input data into a third subset of input data, wherein the third subset of input data includes input data that cannot be categorized as positive input data or negative input data.

At block 930, positive computations may be performed on the subset of positive data to determine one or more first results. The positive computations may be performed as described in the present disclosure.

At block 940, negative computation may be performed on the subset of negative data to determine one or more second results. The negative computations may be performed as described in the present disclosure.

At block 950, the one or more first results and the one or more second results may be aggregated. The first results and the second results may be aggregated as described in the present disclosure.

At block 960, a solution based on the aggregating the first results and the second results may be determined. The solution may be determined as described in the present disclosure.

At block 970, an application using a machine learning algorithm or a deep neural network may be executed based on the determined solution. The application using a machine learning model or a deep neural network may be executed as described in the present disclosure.

Modifications, additions, or omissions may be made to the method 900 without departing from the scope of the disclosure. For example, the designations of different elements in the manner described is meant to help explain concepts described herein and is not limiting. Further, the method 900 may include any number of other elements or may be implemented within other systems or contexts than those described.

It should be understood that the described embodiments may be applied to other computations such as vector-by-matrix, matrix-by-matrix, tensor-by-tensor multiplications, convolution, etc.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A method, comprising:
obtaining input data;
performing computations on the input data using a first arithmetic logic unit to determine one or more first results;
performing computations on the input data using a second arithmetic logic unit to determine one or more second results, wherein the first arithmetic logic unit and the second arithmetic logic unit operate in parallel;
separating the one or more firstresults and the one or more second results into a first subset of data and a second subset of data, the first subset of data including positive data and the second subset of data including negative data;
aggregating, using a positive adder, the first subset of data;
aggregating, using a negative adder, the second subset of data;
determining a solution based on the aggregating the first subset of data and the second subset of data; and
executing an application using a machine learning model or a deep neural network based on the solution.

2. The method of claim 1, wherein the obtained input data includes at least one of 2's complement, 1's complement, or sign-magnitude data representations.

3. The method of claim 1, wherein:
the input data comprise a plurality of input vectors;
the performing computations on the input data using the first arithmetic logic unit comprises multiplying two or more elements of the plurality of input vectors together using the first arithmetic logic unit to determine the one or more first results as a first plurality of element-wise products;
the performing computations on the input data using the second arithmetic logic unit comprises multiplying two or more elements of the plurality of input vectors together using the second arithmetic logic unit to determine the one or more second results as a second plurality of element-wise products;
the separating the one or more first results and the one or more second results into the first subset of data and the second subset comprises separating the first plurality of element-wise products and the second plurality of element-wise products into a first subset of element-wise products and a second subset of element-wise products, the first subset of element-wise products including positive element-wise products and the second subset of element-wise products including negative element-wise products;
the aggregating, using the positive adder, the first subset of data comprises summing, using the positive adder, each element-wise product of the first subset of element-wise products to calculate a first element-wise sum;
the aggregating, using the negative adder, the second subset of data comprises summing, using the negative adder each element-wise product of the second subset of element-wise products to calculate a second element-wise sum; and
the method further comprises subtracting the first element-wise sum and the second element-wise sum.

4. The method of claim 3, wherein the obtaining the input data further comprises:
categorizing one or more bits of each of the input data as Least Significant Bits (LSB) or as Most Significant Bits (MSB); and
setting a portion of the input data categorized as the LSB to zero in performing the multiplying the two or more elements of the plurality of input vectors together using the first arithmetic logic unit to determine the one or more first results as the first plurality of element-wise products.

5. The method of claim 4, wherein the summing, using the positive adder, each element-wise product of the first subset of element-wise products to calculate the first element-wise sum further comprises assigning a gain value to each element-wise product of the first subset, the gain value indicating a corresponding weight associated with each respective element-wise product of the first subset and being based on amplitude of the input data before and after setting the portion of the input data categorized as the LSB to zero.

6. The method of claim 3, wherein each of the first plurality of element-wise products and the second plurality of element-wise products are calculated for each two bits of the plurality of input vectors without using a multiplication.

7. A digital accelerator comprising:
a processor configured to obtain input data, the processor comprising:
 a first arithmetic logic unit configured to perform computations on the input data to determine one or more first results;
 a second arithmetic logic unit configured to perform computations on the input data to determine one or more second results, wherein the first arithmetic logic unit and the second arithmetic logic unit operate in parallel and are configured to separate the one or more first results and the one or more second results into a first subset of data and a second subset of data, the first subset of data including positive data and the second subset of data including negative data;
 a positive adder configured to aggregate the first subset of data;
 a negative adder configured to aggregate the second subset of data; and
 a memory configured to store the first subset of data and the second subset of data; the processor configured to:
 determine a solution based on aggregating the first subset of data and the second subset of data; and
 execute an application using a machine learning model or a deep neural network based on the solution.

8. The digital accelerator of claim 7 further comprising a data representation converter configured to convert one or more of the input data, the one or more first results, and the one or more second results into at least one of sign-magnitude format, 1's complement, or 2's complement.

9. The digital accelerator of claim 7, wherein the first arithmetic logic unit and the second arithmetic logic unit further comprise dedicated hardware configured to accelerate execution of one or more dot product operations that include at least one of vector-by-matrix multiplication, matrix-by-matrix multiplication, or tensor-by-tensor multiplication.

10. The digital accelerator of claim 9, wherein the dedicated hardware for accelerating execution of the dot product operations comprises the positive adder comprises a multi-input adder that includes a plurality of sub-adder circuits, the multi-input adder being configured to:
 determine, by a first subset of sub-adder circuits of the plurality of sub-adder circuits, a plurality of sub-products in a first stage of the multi-input adder; and
 aggregate, by a second subset of sub-adder circuits of the plurality of sub-adder circuits, each respective sub-product of the plurality of sub-products determined by the first subset of sub-adder circuits to determine a final product in a second stage of the multi-input adder.

11. The digital accelerator of claim 10, wherein the multi-input adder includes an adder architecture including at least one of: a ripple carry adder, a carry skip adder, a carry increment adder, a carry look ahead adder, a carry save adder, a carry select adder, or a carry bypass adder.

12. The digital accelerator of claim 10, wherein:
 a first voltage bias is applied to the first subset of sub-adder circuits in the first stage;
 a second voltage bias is applied to the second subset of sub-adder circuits in the second stage; and
 the first voltage bias includes a lower voltage than the second voltage bias.

13. The digital accelerator of claim 7, wherein:
 the input data comprise a plurality of input vectors;
 the first arithmetic logic unit is further configured to perform computations on the input data by multiplying two or more elements of the plurality of input vectors together to determine the one or more first results as a first plurality of element-wise products;
 the second arithmetic logic unit is further configured to perform computations on the input data by multiplying two or more elements of the plurality of input vectors together to determine the one or more second results as a second plurality of element-wise products;
 the first arithmetic logic unit and the second arithmetic logic unit are further configured to separate the one or more first results and the one or more second results into the first subset of data and the second subset by separating the first plurality of element-wise products and the second plurality of element-wise products into a first subset of element-wise products and a second subset of element-wise products, the first subset of element-wise products including positive element-wise products and the second subset of element-wise products including negative element-wise products;
 the positive adder is configured to sum each element-wise product of the first subset of element-wise products to calculate a first element-wise sum;
 the negative adder is configured to sum each element-wise product of the second subset of element-wise products to calculate a second element-wise sum; and
 the processor comprises a subtractor configured to subtract the first element-wise sum and the second element-wise sum.

14. The digital accelerator of claim 13, wherein the processor is further configured to:
 categorize one or more bits of each of the input data as Least Significant Bits (LSB) or as Most Significant Bits (MSB); and
 responsive to multiplying two or more elements of the plurality of input vectors together using at least one of the first arithmetic logic unit or the second arithmetic logic unit, set a portion of the bits of the input data categorized as the LSB to, wherein a number of the bits set to zero depends on a final precision of the computations, a total number of bits of the obtained input data, and a total number of input signals.

15. One or more non-transitory computer-readable storage media configured to store instructions that, in response to being executed, cause a system to perform operations, the operations comprising:
 obtaining input data;
 performing computations on the input data using a first arithmetic logic unit to determine one or more first results;
 performing computations on the input data using a second arithmetic logic unit to determine one or more second results, wherein the first arithmetic logic unit and the second arithmetic logic unit operate in parallel;

separatingthe one or more first results and the one or more second results into a first subset of data and a second subset of data, the first subset of data including positive data and the second subset of data including negative data;

aggregating, using a positive adder, the first subset of data;

aggregating, using a negative adder, the second subset of data;

determining a solution based on the aggregating the first subset of data and the second subset of data; and executing an application using a machine learning model or a deep neural network based on the solution.

16. The one or more non-transitory computer-readable storage media of claim 15, wherein:

the input data comprise a plurality of input vectors;

the performing computations on the input data using the first arithmetic logic unit comprises multiplying two or more elements of the plurality of input vectors together using the first arithmetic logic unit to determine the one or more first results as a first plurality of element-wise products;

the performing computations on the input data using the second arithmetic logic unit comprises multiplying two or more elements of the plurality of input vectors together using the second arithmetic logic unit to determine the one or more second results as a second plurality of element-wise products;

the separating the one or more first results and the one or more second results into the first subset of data and the second subset comprises separating the first plurality of element-wise products and the second plurality of element-wise products into a first subset of element-wise products and a second subset of element-wise products, the first subset of element-wise products including positive element-wise products and the second subset of element-wise products including negative element-wise products;

the aggregating, using the positive adder, the first subset of data of data comprises summing, using the positive adder, each element-wise product of the first subset of element-wise products to calculate a first element-wise sum;

the aggregating, using the negative adder, the second subset of data comprises summing, using the negative adder, each element-wise product of the second sub set of element-wiseproducts to calculate a second element-wise sum; and the operations comprise subtracting the first element-wise sum and the second element-wise sum.

17. The one or more non-transitory computer-readable storage media of claim 16, wherein obtaining the input data further comprises:

categorizing one or more bits of each of the input data as Least Significant Bits (LSB) or as Most Significant Bits (MSB); and setting a portion of the input data categorized as the LSB to zero in performing the multiplying the two or more elements of the plurality of input vectors together using the first arithmetic logic unit to determine the one or more first results as the first plurality of element-wise products.

18. The one or more non-transitory computer-readable storage media of claim 17, wherein the summing, using the positive adder, each element-wise product of the first subset of element-wise products to calculate the first element-wise sum further comprises assigning a gain value to each element-wise product of the first subset, the gain value indicating a corresponding weight associated with each respective element-wise product of the first subset and being based on amplitude of the input data before and after setting the portion of the input data categorized as the LSB to zero.

* * * * *